June 5, 1928.

L. M. OAKLEY

SHOE SOLE

Filed Sept. 23, 1924

1,672,653

Inventor
Laurence M. Oakley
By his Attorneys

Patented June 5, 1928.

1,672,653

UNITED STATES PATENT OFFICE.

LAURENCE M. OAKLEY, OF TRENTON, NEW JERSEY, ASSIGNOR TO ESSEX RUBBER COMPANY, OF TRENTON, NEW JERSEY, A CORPORATION OF NEW JERSEY.

SHOE SOLE.

Application filed September 23, 1924. Serial No. 739,293.

The present invention relates to shoes, and more especially to soles therefor.

Shoes provided with crepe rubber soles have come into extensive use. Although crepe rubber provides an excellent tread surface, the use of this material is attendant with certain disadvantages and the manufacture of shoes provided with such soles is attendant with considerable difficulty due to the nature of the material. In shoes having the usual relatively thick soles of crepe rubber, there is a marked tendency for the soles to spread out at the edges after use for a relatively short period of time and, there is also a tendency for the crepe rubber to pull away from the sole of the shoe. In manufacturing shoes having crepe rubber soles, it is generally necessary to apply the crepe rubber in separate layers and cement the separate layers in place by relatively slow and difficult processes.

It is the object of the present invention to provide a composite out-sole which will retain the well recognized advantages of crepe rubber and overcome some of the disadvantages incident to its use, providing an article which may be more readily attached to a shoe by methods in general use, and which article will be more desirable than the sole composed entirely of crepe rubber.

Figure 1:
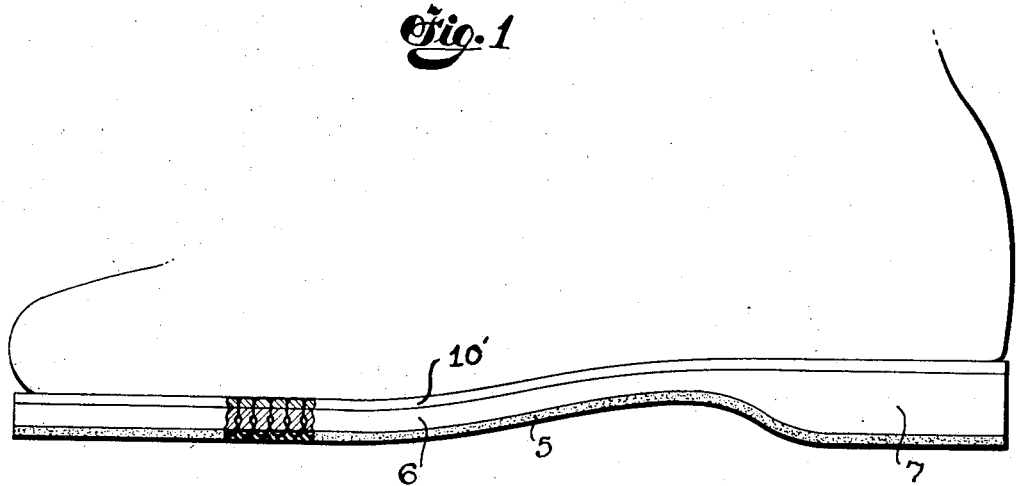

The nature and objects of the invention will be better understood by reference to a description of a particular illustrative embodiment of the invention for the purposes of which description reference should be had to the accompanying drawing forming a part hereof and in which Figure 1 is a side view partly in section of an out-sole constructed in accordance with and embodying the principles of the invention.

Figure 2:
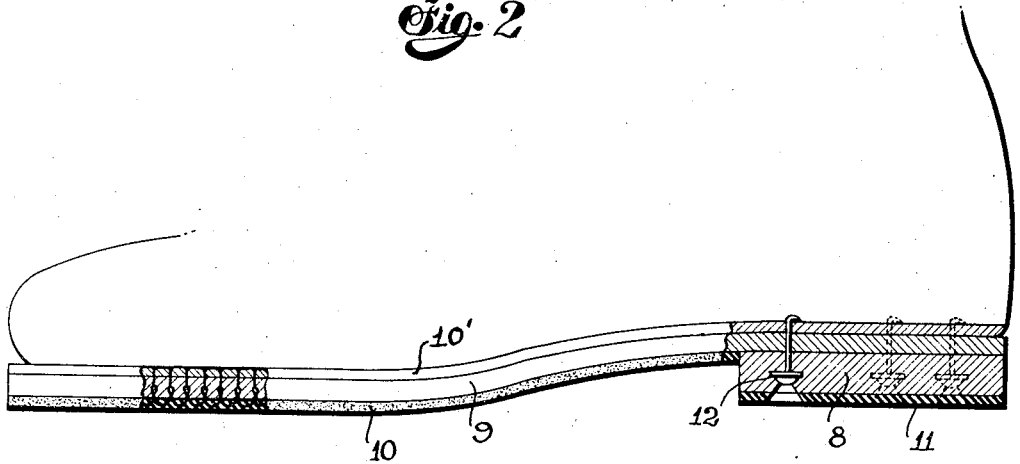

Figure 2 is a similar view showing another embodiment of the invention.

In the structure shown for the purposes of illustration the exposed tread portion of the sole is formed of crepe rubber 5 which crepe rubber is secured to and reinforced by a thickness of tough, high quality, lightweight rubber 6 or the like. This reinforcing layer 6 is buffed on its lower or outer surface and a ply of crepe rubber is securely cemented thereto. The sole may then be subjected to treatment with a chloride of sulphur solution to cure the crepe rubber and insure adherence to the rubber member 6. Ordinarily, one ply of crepe rubber is sufficient to afford the advantage of the crepe rubber soles. In the construction shown in Figure 1, the reinforcing member 6 is slightly thickened at its rear portion to provide a heel 7 and the crepe rubber 5 is carried along the whole sole in a layer of substantially uniform thickness.

In the construction shown in Figure 2, the arrangement is substantially the same as that shown in Figure 1, except that a separate rubber heel 8 is applied directly to the reinforcing member 9, and the crepe rubber is applied over the sole and heel in two separate pieces 10 and 11. This separate heel may be of usual construction having nail receiving washers 12 embedded therein and the outer crepe rubber facing is apertured over the washers to receive the securing nails, or an all rubber heel without washers and nails may be used and the crepe rubber facing may be continuous without apertures.

An entire sole fabricated as above can be stitched through and through in one operation as is generally customary in attaching leather soles, whereas the present method of constructing the crepe rubber soled shoe requires at least two distinct operations in attaching the same. The construction showing this sole as stitched to the welt 10' is clearly shown in section in both Figures 1 and Figure 2. The stitches ordinarily will draw into or through the crepe rubber but they will be held securely by the tougher rubber reinforce.

The foregoing description of a particular embodiment of the invention is illustrative merely and is not intended as defining the limits of the invention.

I claim:

1. As a separate article of manufacture an unattached out-sole comprising in combination an inner thickness of tough, stitch retaining rubber and an outer tread member of crepe rubber.

2. As a separate article of manufacture an unattached out-sole comprising in combination crepe rubber forming a tread surface and a tough stitch receiving rubber compound secured thereto, said tough rubber compound providing means for attaching to a shoe welt.

3. A shoe comprising a welt and a rubber sole having a crepe rubber tread surface, said sole being stitched as a unit to said welt by stitches passing entirely through the whole sole.

4. The method of making shoes which comprises forming separately a complete out-sole comprising a crepe rubber tread and a tough rubber stitch-holding compound and stitching said separately formed complete out-sole to the welt by stitches passed entirely through the out-sole.

In testimony where of I have signed my name to this specification this 19th day of September, 1924.

LAURENCE M. OAKLEY.